May 12, 1931.  C. B. NOELTING ET AL  1,804,639

BALL BEARING CASTER

Filed April 20, 1928

INVENTORS.
CLARENCE B. NOELTING.
WILLIAM H. NOELTING.
BY
ATTORNEYS.

Patented May 12, 1931

1,804,639

UNITED STATES PATENT OFFICE

CLARENCE B. NOELTING AND WILLIAM H. NOELTING, OF EVANSVILLE, INDIANA, ASSIGNORS TO FAULTLESS CASTER COMPANY, OF EVANSVILLE, INDIANA, A CORPORATION

BALL BEARING CASTER

Application filed April 20, 1928. Serial No. 271,447.

This invention relates to a caster which is freely swivable and is particularly suitable for trucks, hospital equipment and beds where ease of movement is desired.

The chief object of the invention is to provide a caster construction that is readily mountable upon a leg or the like whereby the object, such as a truck or bed body is arranged for ease of mobility, the caster construction being further arranged to be readily mounted upon such an object.

The chief feature of the invention consists in the permanent connection between a stem supporting sleeve and a caster stem and the simplified anti-friction mechanism employed therebetween.

Another feature of the invention consists in the formation of the stem supporting sleeve such that it is readily receivable by a side rail of a truck or bed body or may be receivable by an interiorly threaded tubular leg.

Figure 1:
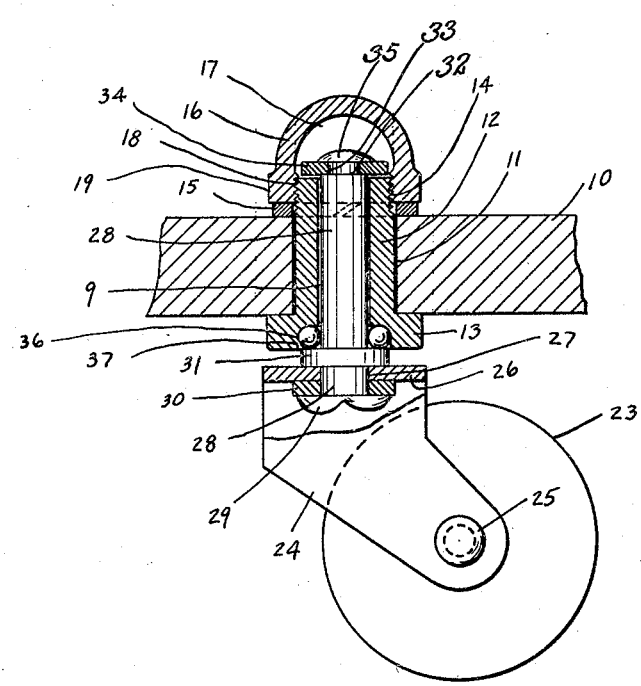
Figure 2:
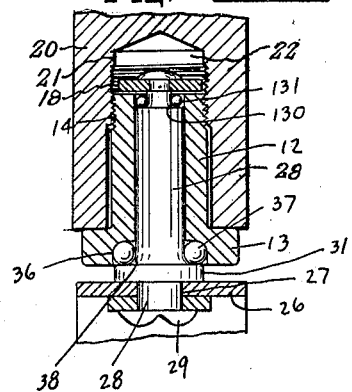
Figure 3:
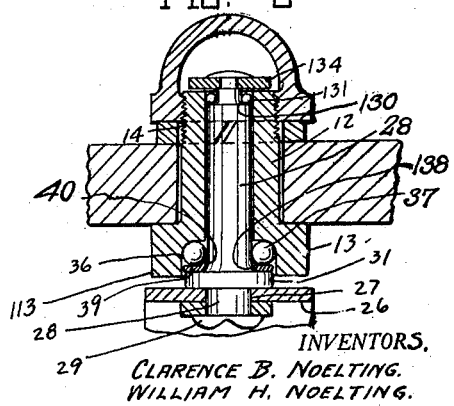

The full nature of the invention will be understood from the accompanying drawings and the following description and claim:

In the drawings Fig. 1 is a central sectional view through a side rail and supporting caster embodying the invention. Fig. 2 is a central sectional view of a slightly modified type wherein an upper ball race and leg type mounting is included. Fig. 3 is a similar view of a still further modified form of the invention shown in Figs. 1 and 2.

In the drawings 10 indicates a side rail of a bed or truck body or a lateral portion of a leg extension of the head or foot of a bed. Said support has a central opening 11 adapted to receive a sleeve 12 which is provided at its lower end with a collar portion 13, the peripheral exterior of which is preferably formed for tool engagement as by being squared or arranged in hexagonal outline or flatted by milling if round stock is employed. A set screw would be used with this form. The opposite and projecting end of the sleeve 12 is exteriorly threaded as at 14 and mounted thereon is a lock washer 15 while a recessed cap 16 having a recess 17 is internally threaded as at 18 to be mounted upon the threaded projecting and upper end of sleeve 12. Cap 16 may contain lubricant and has a tool engageable portion in the form of a hex nut and indicated at 19. When the washer and cap are arranged—as shown—the sleeve is rigidly mounted upon the support 10.

If desired, the sleeve may be rigidly supported by a tubular leg 20 as indicated in Fig. 2 of the drawings. A lubricant chamber 22 may be provided above the sleeve by the bore 21 being extended.

The caster may be of any preferred type. The invention consists in the stem and its connection to and support by the sleeve. Herein a silent or rubber wheel 23 is rotatably supported in the ears 24 by the pin 25 extending across the horn, the yoke of which is indicated by the numeral 26 and is centrally apertured at 27 to receive a pintle or stem 28, the lower end of which is enlarged or upset on 29 on a washer 30, which bears against the lower face of the horn plate. The stem or pintle 28 is enlarged and formed as a collar 31, immediately above the horn plate and thus clampingly mounts the stem upon the horn. As shown in the present form of the invention the stem is substantially cylindrical throughout its length and said stem 28 extends entirely through the sleeve 12 and terminates and projects beyond the same as at 32 and the projecting end 32 is enlarged to engage the upper end of the sleeve 12 to prevent withdrawal of the stem, see Fig. 3. In Fig. 1 such a locking connection is provided by the projecting end 32 having a reduced or shouldered portion 33 and mounted thereon is a washer 34 which lies at the end of the sleeve and also the shoulder portion of the stem. The stem is upset or enlarged as at 35 for retaining the washer on the end.

The clamping and tool engageable collar 13 has the central bore 9 which receives the stem 28 and is enlarged as at 36 and said enlargement is curved to form one combination retaining surface for an anti-friction construction including the balls 37. This surface may be hardened. Also a square corner may be employed. The other anti-friction surface may be the stem enlargement or collar 31. The vertical play between the sleeve and the stem is determined by the position of the retaining washer 34 and this play is insufficient to permit escapement of the balls 37, but is sufficient to permit free swivelling action of the stem with reference to the sleeve. If desired the balls may be of sufficient diameter so that they not only act as a vertical thrust bearing between the collar and the sleeve but also act as a horizontal thrust bearing, by bearing not only on the collar portion of the stem but on the stem immediately adjacent thereto.

To positively insure substantial frictionless swivelling of the caster stem 28 in the bore 9 of the sleeve, the opposite or upper end of the sleeve may be cut away at the corner (see Figs. 2 and 3), and provided with an annular groove 130 to receive an upper annular series of balls 131 which would be retained in position by the washer 134 and thus both ends of the stem would be provided with anti-friction elements to prevent binding of the pintle if there was any tendency to tilt the same in said bore 9.

If desired, the stem 28 may be filleted as at 38 in Fig. 2 or 138 in Fig. 3.

In Fig. 3 there is a still further departure in that the tool engaging portion 13 is extended as at 113 and forms a relatively deep recess. Mounted in said recess and interposed between the enlargement 31 of the stem and the balls 37 is a hardened drawn washer or track member 39 which, if desired and as shown in Fig. 3, is also curved to conform to the filled 138, said curvature being indicated by the numeral 40 in Fig. 3.

Extension 113 forms a relatively dust proof socket. The curved hardened washer shown in Fig. 3 is provided to take the jolt which may occur when the caster roller 23 hits an obstruction for the balls, if much jolting occurs, will gradually wear into the stem since the stem cannot very readily be hardened without danger of crystallization.

The invention claimed is:

In a caster construction the combination of a caster stem receiving sleeve having an exteriorly threaded upper end and an outwardly shouldered load engaging lower end, a chambered member interiorly threaded and receivable by the end of said sleeve, a caster stem swiveled in said sleeve and having its upper end projecting into and terminating within said chamber, means interposed between the chamber projecting end of the stem and the sleeve and mounted within the chamber for permanently connecting said stem to said sleeve, said sleeve having a laterally enlarged bore at its lower end for lateral and axial thrust bearing, said stem including a laterally enlarged portion for cooperating therewith for axial and lateral thrust, anti-friction elements interposed therebetween and seatable in the bore and engaging the stem and the enlargement thereof, said stem connecting means permitting sufficient relatively axial movement for free swiveling but insufficient relative axial movement to permit anti-friction element escapement, and a horn, said laterally enlarged stem portion cooperating therewith for horn anchorage.

In witness whereof, we have hereunto affixed our signatures.

CLARENCE B. NOELTING.
WILLIAM H. NOELTING.